United States Patent
Beiter et al.

(10) Patent No.: US 10,904,243 B2
(45) Date of Patent: Jan. 26, 2021

(54) AUTHENTICATE A FIRST DEVICE BASED ON A PUSH MESSAGE TO A SECOND DEVICE

(71) Applicant: HEWLETT-PACKARD DEVELOPMENT COMPANY, L.P., Houston, TX (US)

(72) Inventors: Michael Bernd Beiter, Ft. Collins, CO (US); Karine Peralta, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 195 days.

(21) Appl. No.: 16/075,627

(22) PCT Filed: Dec. 20, 2016

(86) PCT No.: PCT/US2016/067855
§ 371 (c)(1),
(2) Date: Aug. 4, 2018

(87) PCT Pub. No.: WO2018/118029
PCT Pub. Date: Jun. 28, 2018

(65) Prior Publication Data
US 2019/0052628 A1     Feb. 14, 2019

(51) Int. Cl.
H04L 29/06      (2006.01)
G06F 21/42      (2013.01)
(Continued)

(52) U.S. Cl.
CPC .......... *H04L 63/0853* (2013.01); *G06F 21/31* (2013.01); *G06F 21/42* (2013.01);
(Continued)

(58) Field of Classification Search
CPC ... H04L 63/0853; H04L 67/26; H04L 9/3213; G06F 21/31; G06F 21/44; G06F 21/42; G06F 2221/2103; G06F 9/546
See application file for complete search history.

(56) References Cited

U.S. PATENT DOCUMENTS 9,225,711 B1   12/2015 Sorensen
9,294,455 B2    3/2016 Nassar et al.
(Continued)

FOREIGN PATENT DOCUMENTS

KR    20130077682 A    7/2013
WO     2013036099 A    3/2013
(Continued)

OTHER PUBLICATIONS

Bursztein et al., "SessionJuggler: Secure Web Login From an Untrusted Terminal Using Session Hijacking", Retrieved from internet —http://crypto.stanford.edu/~dabo/papers/SessionJuggler.pdf, 2012, 10 Pages.

*Primary Examiner* — Mahfuzur Rahman
(74) *Attorney, Agent, or Firm* — Tong Rea Bentley & Kim

(57) ABSTRACT

Examples disclosed herein describe authenticating a first electronic device based on a push message to a second electronic device. In one implementation, a processor receives a user identifier from a first electronic device. The processor may select a message communication type based on the user identifier and transmit an authentication information request to a second electronic device using a push message communication of the selected message communication type. The processor may authenticate the user based on the received response to the request and transmit information related to the user authentication to the first electronic device.

12 Claims, 4 Drawing Sheets

(51) Int. Cl.
*G06F 21/44* (2013.01)
*G06F 21/31* (2013.01)
*H04L 9/32* (2006.01)
*H04L 29/08* (2006.01)
*G06F 9/54* (2006.01)

(52) U.S. Cl.
CPC ............ *G06F 21/44* (2013.01); *H04L 9/3213* (2013.01); *H04L 67/26* (2013.01); *G06F 9/546* (2013.01); *G06F 2221/2103* (2013.01)

(56) References Cited

U.S. PATENT DOCUMENTS

| | | | |
|---|---|---|---|
| 9,729,651 B2* | 8/2017 | Jeon | H04L 51/36 |
| 10,607,263 B2* | 3/2020 | Palki | G06F 21/31 |
| 2009/0144812 A1 | 6/2009 | Sasamura et al. | |
| 2009/0248475 A1* | 10/2009 | Choi | G06Q 10/107 |
| | | | 709/219 |
| 2012/0311046 A1* | 12/2012 | Grigoriev | H04L 45/308 |
| | | | 709/206 |
| 2013/0086207 A1* | 4/2013 | Lee | H04L 67/26 |
| | | | 709/217 |
| 2014/0208384 A1 | 7/2014 | Youssefian et al. | |
| 2016/0087981 A1* | 3/2016 | Dorresteijn | H04L 63/0876 |
| | | | 726/7 |
| 2016/0189147 A1* | 6/2016 | Vanczak | G06Q 20/32 |
| | | | 705/71 |
| 2016/0226868 A1* | 8/2016 | Harding | H04L 63/10 |
| 2016/0330160 A1* | 11/2016 | Shan | H04L 65/4076 |
| 2017/0201518 A1* | 7/2017 | Holmqvist | G06F 21/40 |
| 2017/0344226 A1* | 11/2017 | Gudla | H04W 12/06 |
| 2018/0007049 A1* | 1/2018 | Palki | H04L 63/0861 |
| 2018/0278746 A1* | 9/2018 | Yacov | H04L 67/26 |
| 2018/0288060 A1* | 10/2018 | Jackson | H04L 63/102 |
| 2020/0007530 A1* | 1/2020 | Mohamad Abdul | H04L 67/26 |

FOREIGN PATENT DOCUMENTS

| | | |
|---|---|---|
| WO | WO-2016068916 | 5/2016 |
| WO | 2018118029 A1 | 6/2018 |

* cited by examiner

US 10,904,243 B2

1

AUTHENTICATE A FIRST DEVICE BASED ON A PUSH MESSAGE TO A SECOND DEVICE

BACKGROUND

An electronic device may authenticate a user prior to alloy the user access to certain data, hardware, or software. For example, a password, biometric information, or ID badge may be used to authenticate the user. The electronic device may evaluate the received authentication information to determine whether to provide access to the user. For example, a user may not be allowed to use an electronic device until authenticated.

BRIEF DESCRIPTION OF THE DRAWINGS

The drawings describe example embodiments. The following detailed description references the drawings, wherein.

DETAILED DESCRIPTION

Figure 1:
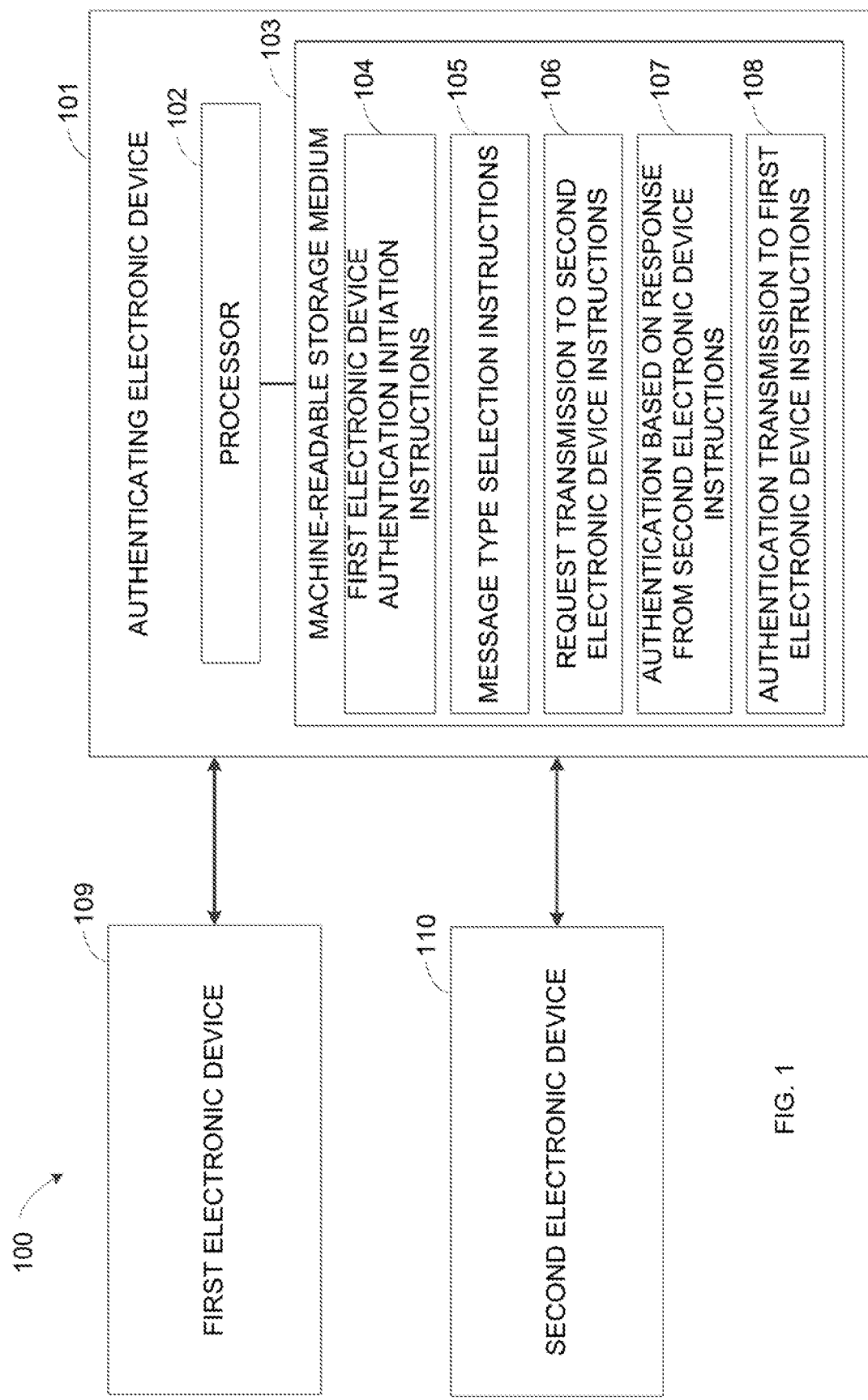
FIG. 1 is a block diagram illustrating one example of a computing system to authenticate a first device based on a push message to a second device.

In one implementation, an authenticating electronic device authenticates a first electronic device based on a push message to a second electronic device. For example, the authenticating electronic device may receive an authentication request from a first electronic device, and the authenticating electronic device may push an authentication request to a second electronic device. For example, the authenticating electronic device may receive an identifier associated with a user and select a communication method and address based on the identifier. The authenticating electronic device may determine authentication information related to the first electronic device, such as related to the particular user, based on a response received from the second electronic device. The authenticating electronic device may transmit the determined authentication information to the first electronic device. The first electronic device may start a user session based on the authentication information and allow a user access to particular data, software, and/or hardware on the first electronic device. As an example, the first electronic device may be a multi-functional printing device, the second electronic device may be a mobile phone associated with a user attempting to send a print job to the multi-functional printing device, and the authenticating electronic device may be an authenticating server associated with an organization or an authentication service.

Allowing a first electronic device to authenticate using an authentication electronic device that pushes an authentication message to a second electronic device allows for an authentication method to be used on the first electronic device that may not otherwise be available or may be inconvenient. For example, the second electronic device may include a keyboard or other input device or method not included or difficult to use on the first electronic device. An authentication electronic device may allow new authentication technologies to be used on the first electronic device without adapting the first electronic device to support those technologies. An authentication electronic device may be associated with a device such that different entities may use different protocols for authenticating based on the different authentication services provided by the authentication electronic device. An authentication electronic device may make authentication processes more streamlined between multiple devices such that the authenticating electronic device, may provide authentication information to multiple devices associated with the same user or account. Using an authentication electronic device to push an authentication message to a second electronic device may allow the second electronic device to provide information used for authentication without being in the same trust domain as the first electronic device. For example, a particular type of relationship between the first and second electronic device may not exist, such as where the second electronic device is associated with a user, and the first electronic device is a shared device available to an entire entity.

FIG. 1 is a block diagram illustrating one example of a computing system to authenticate a first device based on a push message to a second device. The computing system 100 may include an authenticating electronic device 101 to authenticate a first electronic device 109 based on a response to an authentication request pushed to the second electronic device 110.

The first electronic device 109 may be any suitable electronic device that authenticates a user. For example, the first electronic device 109 may allow access to data, software, and/or hardware after authenticating a user. The first electronic device 109 may include a storage for storing authentication session information. For example, the first electronic device 109 may allow a user to use the first electronic device 109 or particular functionality of the first electronic device 109 while the stored authentication session information indicates that the session is active. The first electronic device 109 may be, for example, a printer, 3D printer, Internet of Things device, and/or wearable device.

The second electronic device 110 may be any suitable electronic device to receive and/or store authentication information. For example, the second electronic device 110 may be a device associated with the user being authenticated, such as a mobile phone, wearable device, or laptop of the user. The second electronic device 110 may be a previously authenticated electronic device that stores authentication information that may be transmitted without receiving user input. The second electronic device 110 may include a keyboard or user interface to allow a user to provide input related to the authentication, such as for receiving user input related to a password.

In one implementation, the first electronic device 109 and the second electronic device 110 are different types of devices. For example, the first electronic device 109 may be a shared office device, and the second electronic device 110 may be a personal electronic device. The second electronic device 110 may allow for user input in a manner not allowed by the first electronic device 109. For example, the first electronic device 109 may be a multi-functional printer (MFP) or display, and the second electronic device 110 may be a mobile phone or laptop.

The authenticating electronic device 101 may be any suitable device for determining authentication information. The authenticating electronic device 101 may communicate with the first electronic device 109 and the second electronic device 110 via a network. For example, the authenticating electronic device 101 may be a service for providing a cloud server for authenticating devices. The authenticating electronic device 101 may include a processor 103, and a machine-readable storage medium 104.

The processor 102 may be a central processing unit (CPU), a semiconductor-based microprocessor, or any other device suitable for retrieval and execution of instructions. As an alternative or in addition to fetching, decoding, and executing instructions, the processor 102 may include one or more integrated circuits (ICs) or other electronic circuits that comprise a plurality of electronic components for performing the functionality described below. The functionality described below may be performed by multiple processors.

The processor 102 may communicate with the machine-readable storage medium 103. The machine-readable storage medium 103 may be any suitable machine readable medium, such as an electronic, magnetic, optical, or other physical storage device that stores executable instructions or other data (e.g., a hard disk drive, random access memory, flash memory, etc.). The machine-readable storage medium 103 may be, for example, a computer readable non-transitory medium. The machine-readable storage medium 103 may include first electronic device authentication initiation instructions 104, message type selection instructions 105, request transmission to second electronic device instructions 106, authentication based on response from second electronic device instructions 107, and authentication transmission to first electronic device instructions 108.

The first electronic device authentication initiation instructions 104 may include instructions to receive a request from the first electronic device 109 related to an authentication request. The request may include any suitable information, such as identifier information related to the user and the first electronic device 109. The request may be related to authenticating for a particular task, role, or permission type on the first electronic device 109. The authenticating electronic device 101 may receive the request via a network.

In one implementation, the authenticating electronic device 101 includes a storage to store authentication information, such as in the machine-readable storage medium 103 or in a separate storage. For example, when the authenticating electronic device 101 receives a request from the first electronic device 109, the authenticating electronic device 101 may store related data, such as a session ID associated with the request. The authenticating electronic device 101 may update the storage record associated with the request based on the status of the authentication process.

The message type selection instructions 105 may include instructions to determine a message type for requesting information from the second electronic device 110. For example, potential message types may include email, SMS, and/or direct communication through an app installed on a device. The message type may be selected in any suitable manner, such as based on stored information related to user preference, location, or available devices. The message type may be selected based on the first electronic device, such as where certain types of secure message types are used by particular electronic devices for authentication. The authenticating electronic device 101 may send multiple messages in parallel. For example, the authenticating electronic device 101 may send both an email and SMS message.

The request transmission to second electronic device instructions 106 may include instructions for the authenticating electronic device 101 to push an authentication message to the second electronic device 110. The message may be sent via the selected message type. The message may be sent to a particular device or to an account from which multiple electronic devices may be used to access the message. The authenticating electronic device 101 may request information from the second electronic device 110 to confirm that the account is accessed from a different device than the first electronic device.

The authentication based on response from second electronic device instructions 107 may include instructions to determine authentication information based on information received from the second electronic device 110 in response to the authentication request. The authenticating electronic device 101 may use any suitable information to determine the authenticity. The authentication may be performed in any suitable manner, such as by comparing received information to stored information associated with the user.

The authentication transmission to first electronic device instructions 108 may include instructions to transmit authentication information to the first electronic device 109 from the authenticating electronic device 101, such as via a network. The authenticating electronic device 101 may transmit any suitable authentication information to the first electronic device 109. For example, the authentication information may be specific to the first electronic device 109 such that the same authentication information may not be used for additional electronic devices.

In one implementation, the authenticating electronic device 101 updates stored user authentication information after transmitting the authentication information to the requesting device. For example, the authenticating electronic device 101 may store information about the transmission, such as time of authentication, or delete authentication information related to a completed request.

In one implementation, the authenticating electronic device 101 transmits the authentication information to additional devices. For example, the authenticating electronic device 101 may transmit the authentication information to the second electronic device 110 and/or to additional electronic devices. In one implementation, the authenticating electronic device 101 receives information from the first electronic device 109 indicating that the user is successfully authenticated on the first electronic device 109, such as information about the particular authentication session, such as a user ID, session time stamp, or other information related to the authenticated session.

Figure 2:
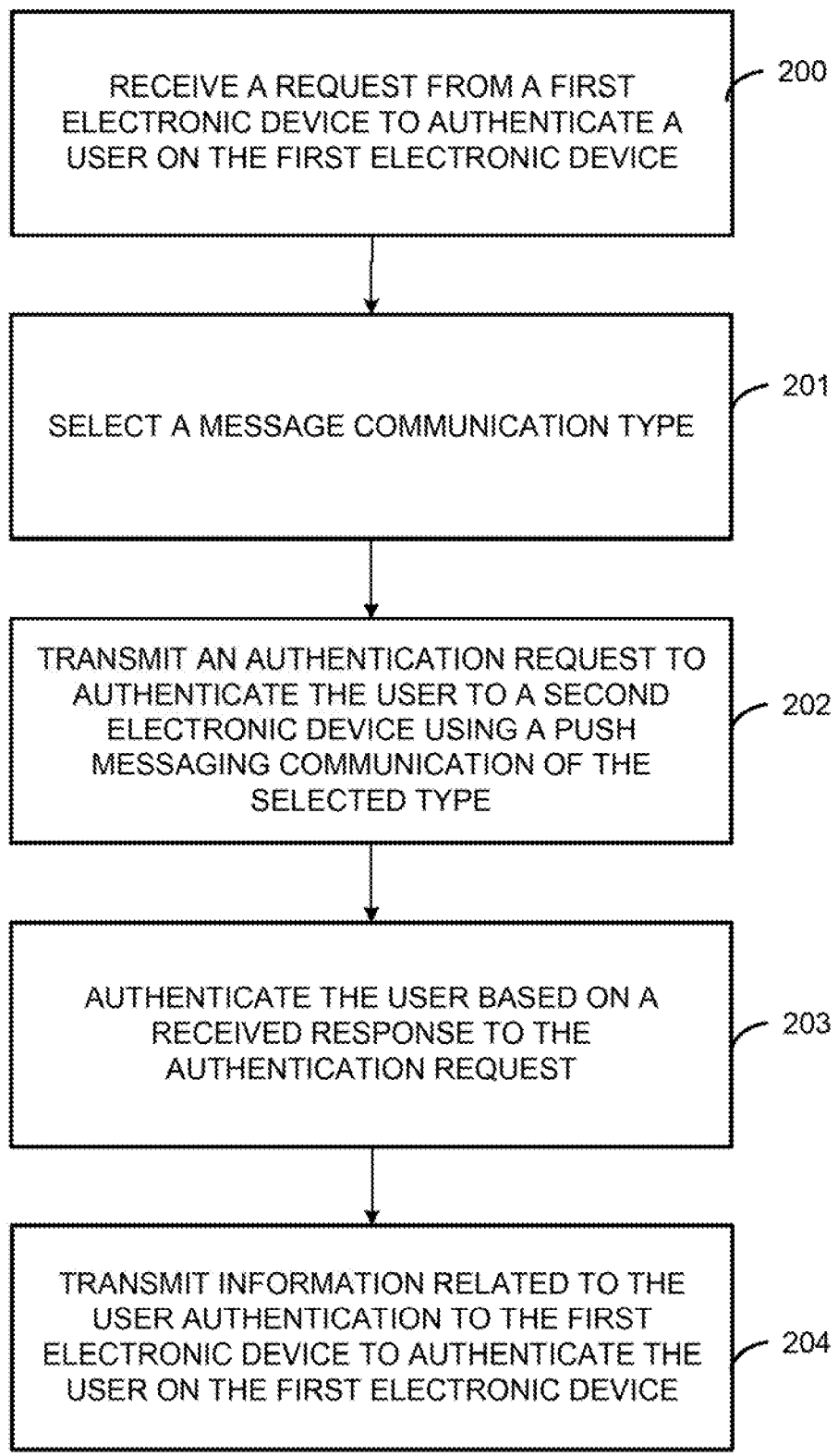
FIG. 2 is a flow chart illustrating one example of a method to authenticate a first device based on a push message to a second device.

FIG. 2 is a flow chart illustrating one example of a method to authenticate a first device based on a push message to a second device. For example, an authentication server may push a message to a second electronic device to receive information used to authenticate the user on the first electronic device. The authenticating server may transmit authentication information to the first electronic device such that the user may begin a session on the first electronic device. The method may be implemented, for example, by the computing system 100 of FIG. 1.

Beginning at 200, an authenticating electronic device receives a request from a first electronic device to authenticate a user an the first electronic device. The authenticating electronic device may receive the request in any suitable manner, such as via a network. The authenticating electronic device may be associated with an entity and/or a service. For example, the authenticating electronic device may be associated with an authentication cloud service. The authenticating electronic device may receive any suitable information associated with the request. For example, the authenticating electronic device may receive information about the user, first electronic device, or access type requested. The authenticating electronic device may receive user information related to the user to be authenticated. The user identification information may be a user name, identifier, biometric data, or other information to indicate a user attempting to use the first electronic device.

The first electronic device may be any suitable electronic device. In one implementation, the first electronic device is shared among multiple users that are authenticated to begin a user session. For example, the first electronic device may be a printer, 3D printer, and/or smart office device. The first electronic device may display a user interface to receive user input or otherwise receive input from a user initiating a session with the first electronic device. For example, a user may scan a badge or mobile phone to gain access to the first electronic device or may use NFC to provide information from a user's device. The first electronic device may display a pre-configured list or other information to allow the user to select an identifier associated with the user. The first electronic device may have a browser, app, or other user interface to allow the user to provide information about the user identity.

The authenticating electronic device may store session information associated with the user identification information. The session information may be any suitable information associated with a session for the user on the first electronic device. The session information may include information about the user, the first electronic device, and/or the authentication request. For example, the session information may include information about the time and type of authentication request. In one implementation, the authenticating electronic device may compare information about the session to other session information, such as to create a summary of the type of authentication requests made to the authenticating electronic device.

Continuing to 201, the authenticating electronic device selects a message communication type. The message communication type may be any suitable type, such as email, SMS, or direct app communication. The message communication type may be selected in any suitable manner, such as based on stored settings associated with the user and/or first electronic device. The message communication type may be selected based on security associated with the message type such that different electronic devices may authenticate using different levels of security. The authenticating electronic device may access information related to an address associated with the user for the communication type, such as an email or a phone number, in order to push the message. The user identifier may be associated with a particular user such that the authenticating electronic device may determine multiple messaging addresses for the user based on the user identifier, such as where both an email and SMS message may be sent based on the username associated with a service.

Continuing to 202, the authenticating electronic device transmits an authentication request to authenticate the user to a second electronic device using a push messaging communication of the selected type. For example, the message communication type may be selected from email, SMS, biometric, or other request types. The second electronic device may be a specified device for the message or a device selected by the user to receive the message. For example, the message may be an SMS message that may be received at multiple devices, and the user may select a device from which to respond. In one implementation, the authentication message is intended for a particular device such that both a message identifier and device identifier are associated with the authentication. The message may be sent to a third party service that then transmits the message to the second electronic device.

The second electronic device may display a user interface for the user to respond to the authentication method. For example, the authentication message may include a URL in an email message such that the user may open the URL and provide additional information to be transmitted to the authenticating electronic device. The authentication method may involve biometric data, such as where the user provides a finger print to the second electronic device. The authentication of the user may be determined based on the user having access to the message on the second electronic device and/or an additional challenge to the user, such as for a key. The message may include encrypted information that may be decrypted by the specific user and/or request a response including an encrypted message that may be decrypted by the authenticating electronic device or first electronic device. In one implementation, the second electronic device authenticates the user without user input. For example, the second electronic device may include a storage with authentication information that is transmitted to the authenticating electronic device. The second electronic device may determine that a user is already logged into the second electronic device, for instance based on a session token available in the local storage or available access to locally cached authentication credentials. The second electronic device may transmit such authentication information without additional user input if determined that a user is already logged in. In one implementation, the second electronic device includes an app or other software for generating a session token that may be used to create authentication information to transmit to the authenticating electronic device. Additional electronic devices may be used for authentication, such as where information from a user device and information from a cloud storage is used to transmit information to the authenticating electronic device.

Continuing to 203, the authenticating electronic device authenticates the user based on a received response to the authentication request. For example, the authenticating electronic device may receive any suitable information from the second electronic device used to authenticate the first electronic device. The authenticating electronic device may receive information that the authenticating electronic device compares to stored information to determine authenticity. In one implementation, the second electronic device may attempt to authenticate the user and transmit information about eventual authentication failure, such as due local processing errors, to the authenticating electronic device. The authenticating electronic device may use stored authentication or session information to create authentication session information to be used by the first electronic device. Authenticating the user may involve creating a device specific authentication token for the user session. The token may be created based on specific rules associated with a device, device type, and/or entity.

Continuing to 204, the authenticating electronic device transmits information related to the user authentication to the first electronic device to authenticate the user on the first electronic device. The authenticating electronic device may transmit any suitable information usable by the first electronic device to authenticate the user. For example, the authenticating electronic device may transmit a token or other information. The authenticating electronic device may transmit information to the first electronic device such that the first electronic device authenticates the user based on the received information and additional information.

The first electronic device may receive the authentication information in any suitable manner. For example, the first electronic device may poll the authenticating electronic device to request the authentication information, and the authenticating electronic device may transmit the authentication information in response to the request. For example, the authenticating electronic device may check the status of the user session ID in a storage and send information about the status. The status may be updated when a response is received from the second electronic device. In one implementation, the authenticating electronic device transmits the information to the first electronic device without receiving a second request from the first electronic device. For example, the information may be automatically transmitted such that an active communication channel is not open between the authenticating electronic device and first electronic device during the entire authentication process.

The first electronic device may create a user session based on the received information. In one implementation, the first electronic device authenticates the user based on the received information and information stored on the first electronic device.

The authenticating electronic device may transmit authentication information back to the second electronic device. For example, the authenticating electronic device may issue token to the second electronic device to be stored on the second electronic device to be used for future authentication requests. The second electronic device may use received authentication information to allow the user access to particular data, software, and/or hardware on the second electronic device.

In one implementation, the authenticating electronic device manages user access on multiple devices. For example, the authenticating electronic device may revoke tokens on per device or per user basis. The authenticating electronic device may update authentication based on audits of session tokens and rules, such as related to redundancy of tokens.

Figure 3A:
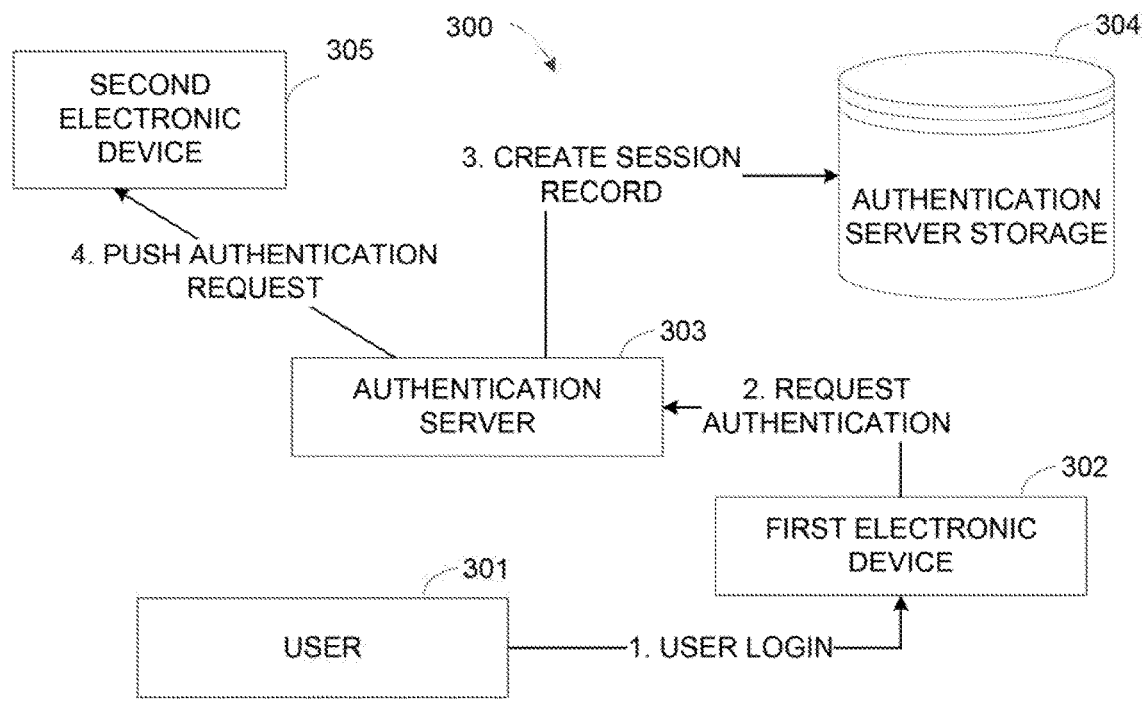
FIGS. 3A-3C are block diagrams illustrating examples of authenticating a first device based on a push message to a second device.
Figure 3B:
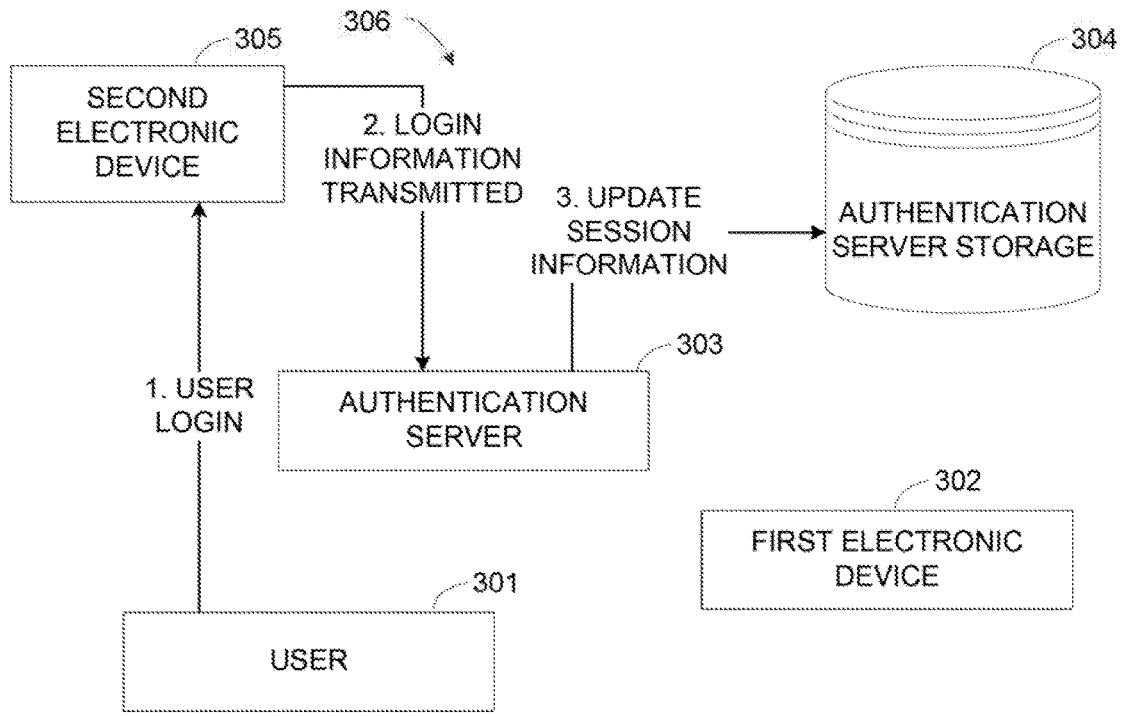
Figure 3C:
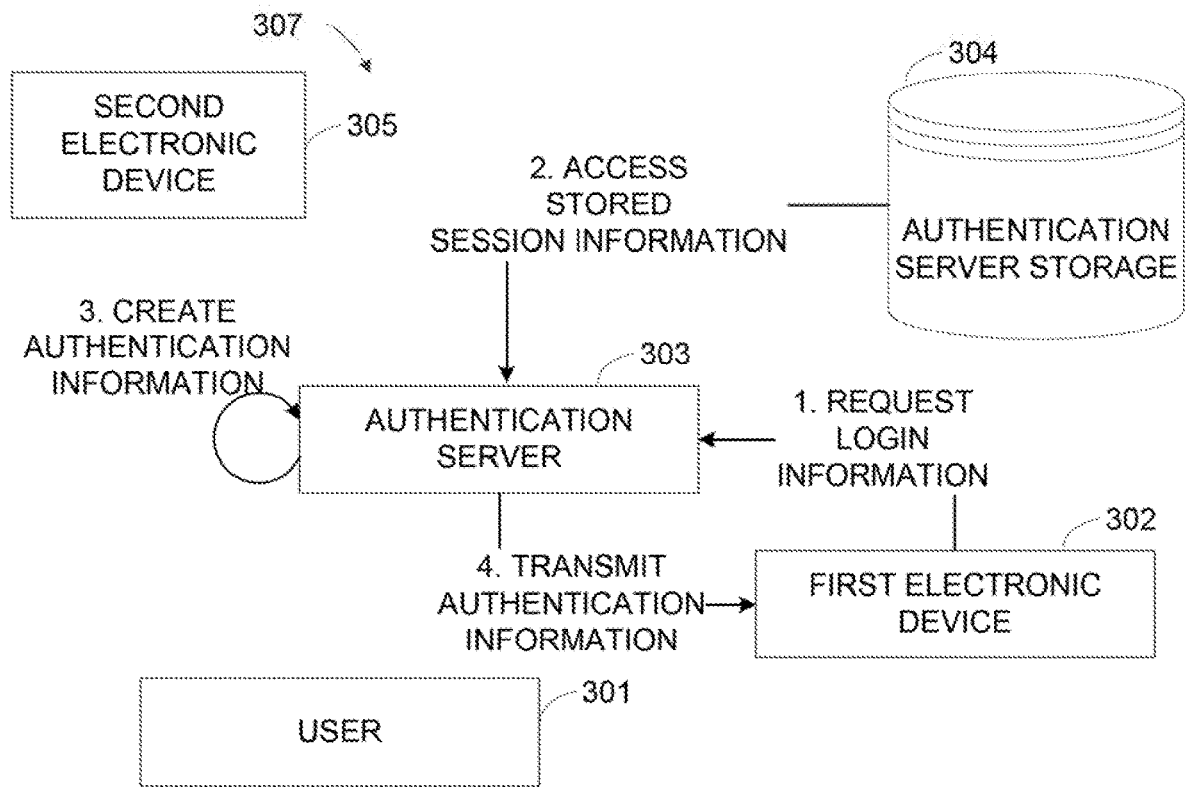

FIGS. 3A, 3B, and 3C are block diagrams illustrating examples of authenticating a first device based on a push message to a second device. FIG. 3A-3C include a user 301, first electronic device 302, authentication server 303, authentication server storage 304, and second electronic device 305. The user 301 may be a user assigned an account, login, identifier, or other information used to identify the user to the first electronic device 302. The first electronic device 302 may be any suitable electronic device which may be accessed by the user 301. The authentication server 303 may be a server for determining authentication information and pushing an authentication request to the second electronic device 305. The authentication server storage 304 may be any suitable storage accessible by the authentication server 303 for storing information related to an authentication determination. The second electronic device 305 may be any suitable electronic device that may receive a message pushed from the authentication server 304. The second electronic device 305 may be associated with the user 301.

FIG. 3A is a block diagram showing one example 300 of an authentication request pushed from an authentication server. First, a user 301 logs on or otherwise initiates a session on the first electronic device 302. Information transmitted to the authentication server may include information about the requesting device, user identifier information, and meta data associated with the user. Second, the first electronic device 302 transmits an authentication request to the authentication server 303. Third, the authentication server 303 stores information about the request and/or authentication in the authentication server storage 304. For example, the authentication server 303 may store a user session record in the authentication server storage 304. The session ID may be used to track the state of the authentication, such as whether a request to a second electronic device has been sent and/or a response received. Fourth, the authentication server 303 pushes an authentication message to the second electronic device 305. For example, the authentication server may determine that an authentication message of a particular type is to be used for the user or device and transmit that type of message.

FIG. 3B is a block diagram showing one example 300 of determining authentication information based on information received from an authentication request. First, the user 301 logs in or otherwise provides information to the second electronic device 305. Second, the second electronic device 305 transmits authentication information received based on the user input to the authentication server 303. Third, the authentication server 303 stores information about the authentication in the authentication server storage 304. For example, information associated with the session ID may be updated to reflect the received response.

FIG. 3C is a block diagram showing one example 307 of providing authentication information to an electronic device. First, the first electronic device 302 requests authentication information from the authentication server 303. Second, the authentication server 303 accesses stored information from the authentication server storage 304. Third, the authentication server 303 determines authentication information based on the request and the accessed stored information. Fourth, the authentication server 303 transmits information related to the authentication determination to the first electronic device 302. The first electronic device may provide user access to data, hardware, and/or software based on the received authentication information.

Figure 4:
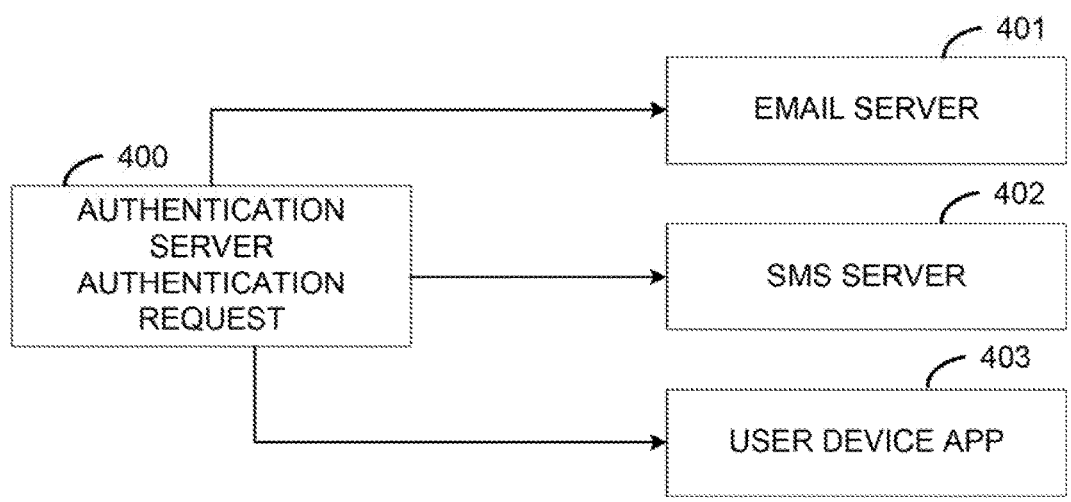
FIG. 4 is a block diagram illustrating one example of pushing to a second electronic device an authentication request related to authenticating a first electronic device.

FIG. 4 is a block diagram illustrating one example of pushing to a second electronic device an authentication request related to authenticating a first electronic device. For example, the authentication request 400 may be transmitted in parallel using multiple communication methods. The communication methods may be tailored to a particular electronic device or may be transmitted to an account that may be accessed on multiple devices. For example, the authentication request 400 is transmitted to an email server 401, SMS server 402, and user device app 403. Transmitting multiple types of messages may allow a user to select which method and device to use for authentication, such as which device is more accessible at the time of authentication. Using an authenticating electronic device to push a message to a second device to authenticate a first device may allow for a more convenient and secure authentication method.

The invention claimed is:

1. A computing system, comprising:
    a semiconductor-based processor of an authenticating electronic device to:
        initiate user authentication based on a request from a first electronic device to authenticate a user;
        select a message communication type based on a user identifier;
        transmit an authentication information request to a second electronic device using a push message communication of the message communication type that is selected;
        authenticate the user based on a received response to the authentication information request from the second electronic device via an input device of the second electronic device to receive the authentication information, wherein the input device is absent from the first electronic device;

transmit information related to authentication of the user to the first electronic device, wherein the authenticating electronic device, the first electronic device, and the second electronic device are physically separate devices; and a storage to store user authentication information, wherein the processor is further to store information related to a user identification and authentication status in the storage.

2. The computing system of claim 1, wherein the processor is further to update the user authentication information that is stored to indicate that the authentication of the user is transferred to the first electronic device.

3. The computing system of claim 1, wherein the processor is further to transmit the authentication information request using multiple message communication types in parallel.

4. The computing system of claim 1, wherein transmitting the information related to the authentication of the user comprises transmitting authentication information specific to the first electronic device.

5. The computing system of claim 1, wherein the processor is further to transmit information related to the authentication of the user to the second electronic device.

6. The computing system of claim 1, wherein the second electronic device allows for user input in a manner not allowed by the first electronic device.

7. A method, comprising:
receiving, by an authentication electronic device, a request from a first electronic device to authenticate a user on the first electronic device;
selecting a message communication type;
transmitting an authentication request to authenticate the user to a second electronic device using a push messaging communication of the message communication type that is selected;
authenticating the user based on a received response to the authentication request from the second electronic device via an input device of the second electronic device to receive authentication information, wherein the input device is absent from the first electronic device, wherein the response from the second electronic device comprises the authentication information stored on the second electronic device and transmitted to the authentication electronic device; and
transmitting, by the authentication electronic device, authentication information to the first electronic device to authenticate the user on the first electronic device, wherein the authenticating electronic device, the first electronic device, and the second electronic device are physically separate devices.

8. The method of claim 7, further comprising authenticating the user, by the first electronic device, based on the authentication information received from the authentication electronic device.

9. The method of claim 7, wherein authenticating the user comprises creating a device authentication token and wherein transmitting the authentication information comprises transmitting the device authentication token to the first electronic device.

10. The method of claim 7, wherein the second electronic device displays a user interface to receive authentication user input from the user.

11. A machine-readable non-transitory storage medium comprising instructions executable by a processor of an authenticating electronic device to:
receive an authentication request from a first electronic device including user identification information;
store authentication information based on at least one of information related to the first electronic device and the user identification information;
select an authentication message type;
push an authentication request to a second electronic device using the authentication message type that is selected;
receive authentication information from the second electronic device via an input device of the second electronic device to receive the authentication information, wherein the input device is absent from the first electronic device;
update the authentication information that is stored based on the authentication information that is received;
generate first electronic device authentication session information based on the authentication information that is stored; and
transmit the first electronic device authentication session information to the first electronic device, wherein the authenticating electronic device, the first electronic device, and the second electronic device are physically separate devices, wherein the instructions to transmit the first electronic device authentication session information comprise instructions to respond to a second request from the first electronic device for the authentication information.

12. The machine-readable non-transitory storage medium of claim 11, further comprising instructions to push the authentication request using a second authentication message type.

* * * * *